W. C. WINFIELD & A. C. TAYLOR.
ELECTRIC WELDING MACHINE.
APPLICATION FILED JUNE 9, 1911.
1,154,470.
Patented Sept. 21, 1915.
4 SHEETS—SHEET 1.
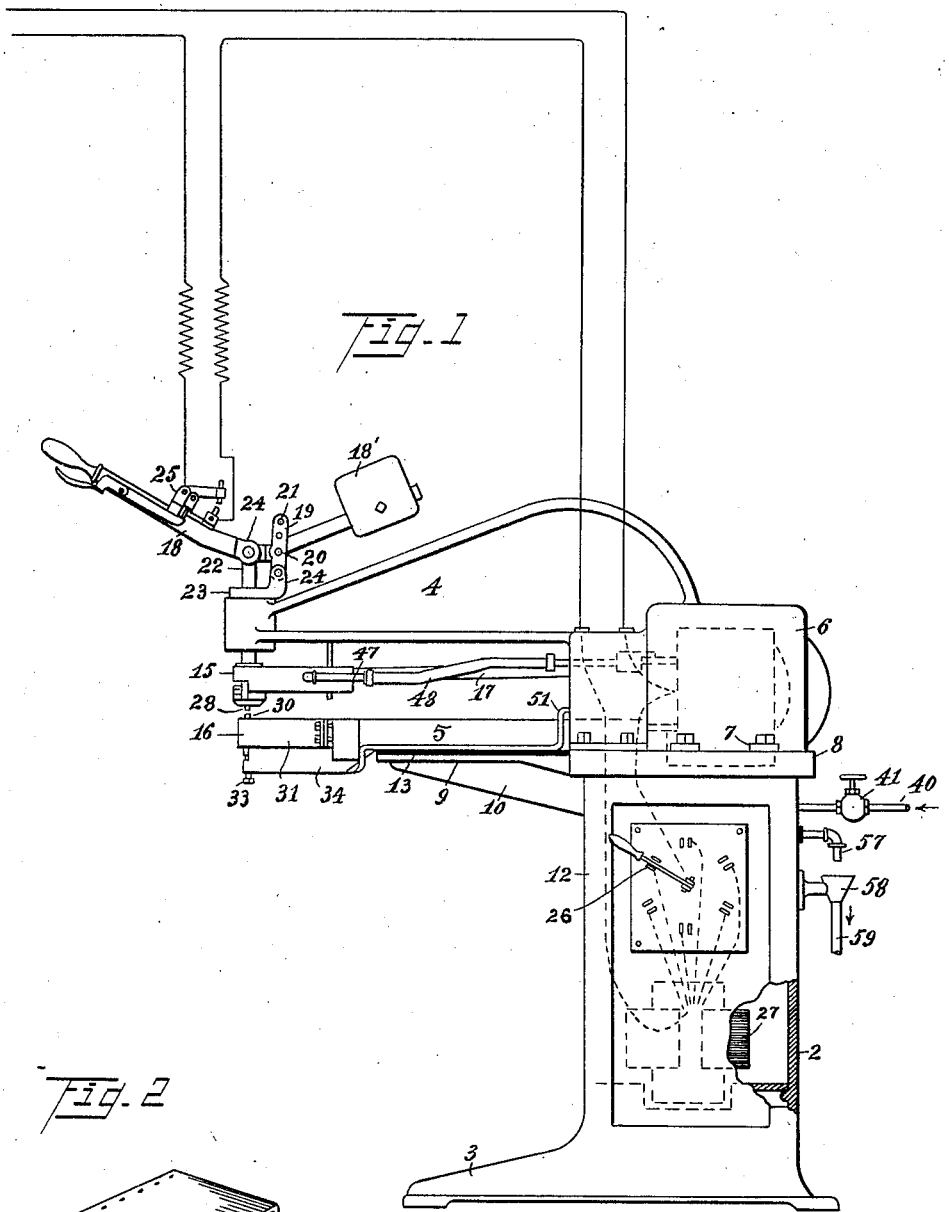

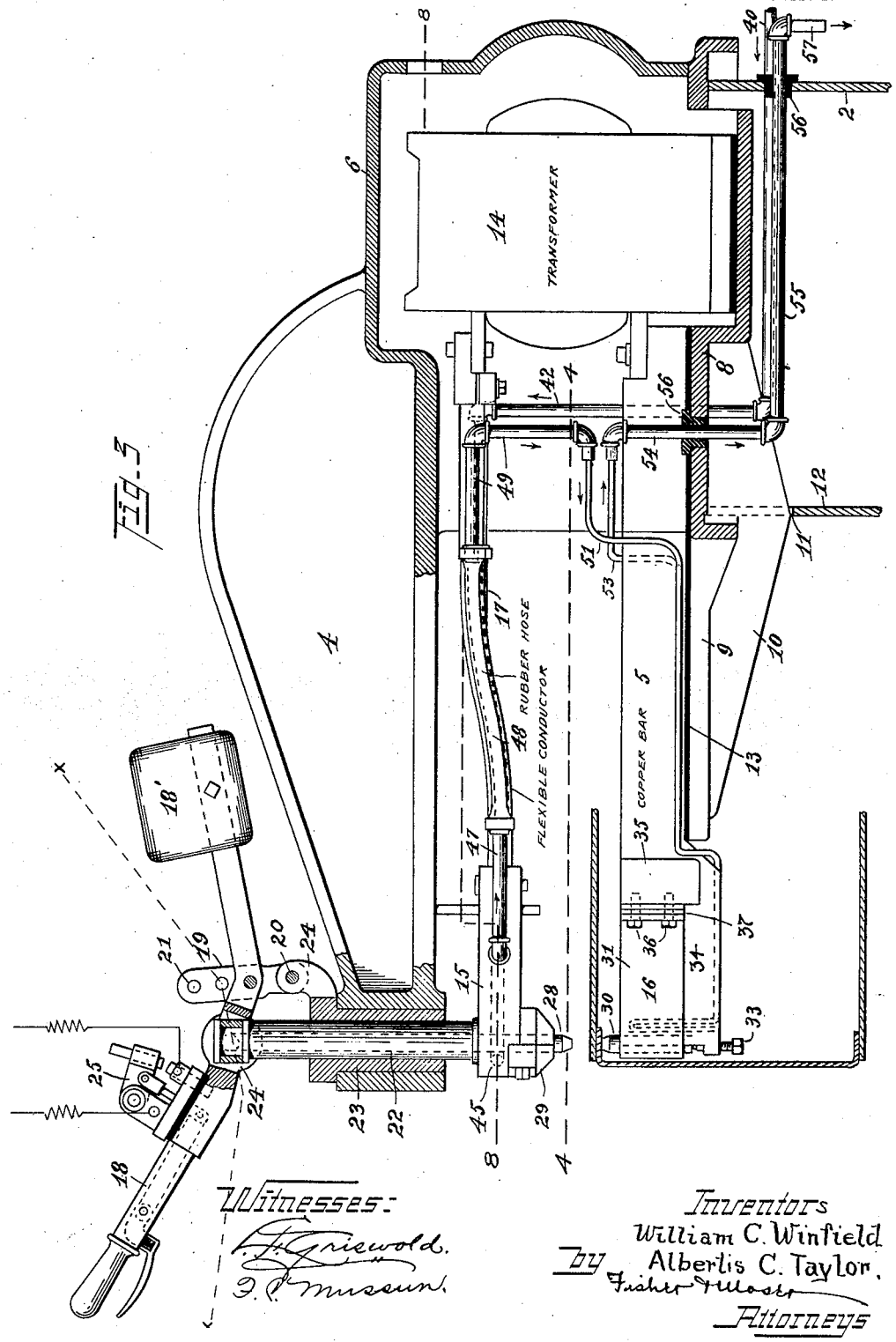

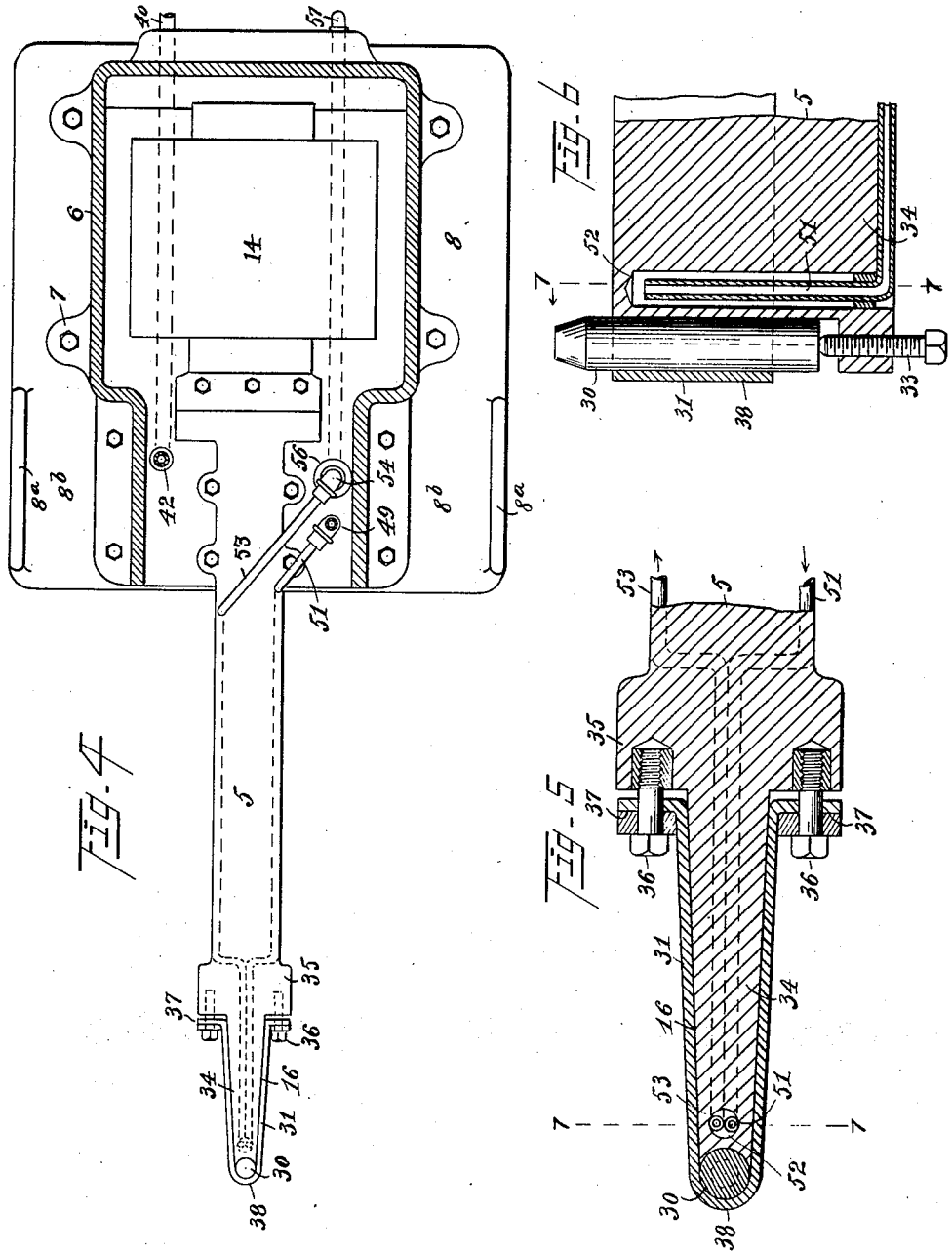

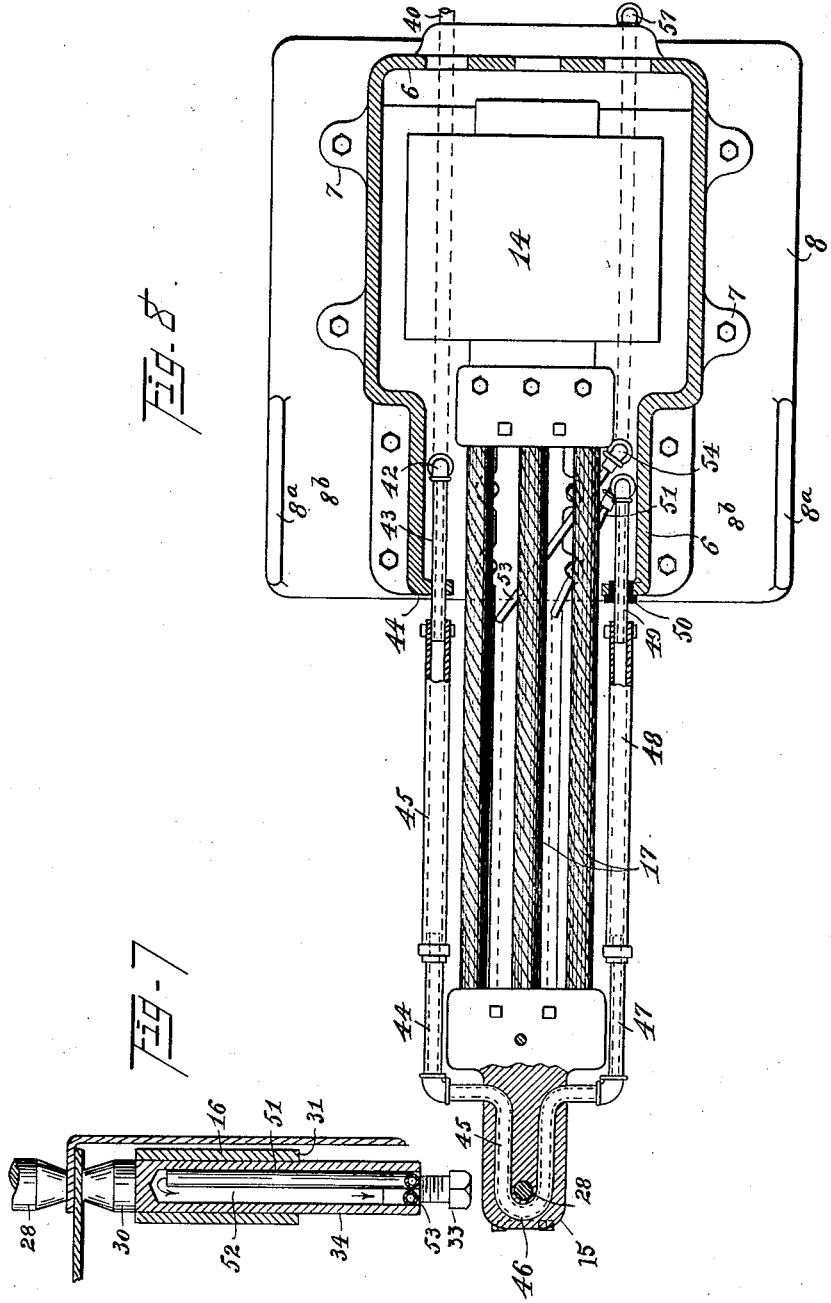

UNITED STATES PATENT OFFICE.

WILLIAM C. WINFIELD AND ALBERTIS C. TAYLOR, OF WARREN, OHIO, ASSIGNORS TO THE WINFIELD ELECTRIC WELDING MACHINE COMPANY, OF WARREN, OHIO, A CORPORATION.

ELECTRIC WELDING-MACHINE.

1,154,470.  Specification of Letters Patent.  Patented Sept. 21, 1915.

Application filed June 9, 1911. Serial No. 632,211.

*To all whom it may concern:*

Be it known that we, WILLIAM C. WINFIELD and ALBERTIS C. TAYLOR, citizens of the United States, residing at Warren, in the county of Trumbull and State of Ohio, have invented certain new and useful Improvements in Electric Welding-Machines, of which the following is a specification.

Our invention relates to electric welding machines, and the invention is an improvement in the type of machine shown in Letters Patent of the United States, dated December 13, 1910, and numbered 978,418.

In this type of machine the pressure method of Elihu Thomson is followed, using a pair of oppositely-disposed contact electrodes to localize the pressure and electric current to produce a weld between overlapped pieces of metal. Welding may involve contiguous areas or not as the operator may elect but generally all requirements are met by welding at a number of separated points as suggested by riveting operations. For example, instead of riveting the seams of boxes or other articles made of metal, the overlapped parts may be welded together at intervals instead; but as this step involves the placing of the electrodes upon the inside as well as the outside of the box, lap-welding in or at the corners by the ordinary means would often be difficult or impossible.

Therefore, one of our objects is to provide an electrode clamping holder particularly constructed to permit welds to be made between overlapped parts where the room is limited as along a corner seam or wherever an angular relation of walls may make it difficult or impossible to weld by the means now known and provided.

A further object of our invention is to provide means to keep the clamping holders and electrodes cool by a regulated flow of water, thereby materially contributing to the efficiency of the machine by localizing the heat at the work and by increasing the life and durability of the parts directly involved in heating operations. To particularize, when the contact electrodes are overheated, more current is needed and the wear on the points is more rapid than when kept cool. Constant water circulation prevents spread and loss of heat through the frame and operating parts, and the machine can be constantly used without inconvenience to the operator and without interruption if continuous use is desired.

The welding together of superimposed plates necessitates in many instances the placing of the welding electrodes at the outer extremity of long over-reaching arms between which the work may be placed; but economy of construction and saving in current dictate a relatively close setting of the electrodes to the transformer. Therefore, the upper arm of our improved machine is particularly constructed to inclose the transformer, and the base of the machine is utilized to incase a second transformer or current regulator, and this base is provided with a forwardly-extending foot to off-set the excessive over-hang of the arms which sustain the weight of the work and the pressure of welding operations.

The degree of pressure applied by the handle to make a weld varies according to the kind of material operated upon and the thickness thereof, and therefore, it is exceedingly desirable to place the operator sensitively in touch with the pressure applying means. This result is best obtained by providing smoothness and ease of operation of the movable electrode holder as well as a changeable setting of the parts to permit different operators having different length of reach of arm to work to the best advantage, or the same operator to work to the best advantage on work of different shapes and thicknesses. In our improved machine, sensitiveness of control, ease of operation and change of setting is provided for by means adapting adjustment or shift of the fulcrum pivot for the operating lever.

Other objects are also embodied in other details of construction as will hereinafter be observed and more particularly pointed out in the claims.

In the accompanying drawings, Figure 1 is a reduced side view of our improved electric welding machine, showing its electrical connections in diagram. Fig. 2 is a perspective view of a sheet-metal box to illustrate one application of corner welding. Fig. 3 is a side elevation and part-sectional view, enlarged as compared with Fig. 1, of the upper portion of our improved machine, and showing overlapped pieces of metal in position to be welded. Fig. 4 is a plan view in section taken on line 4—4, Fig. 3, looking down on the lower arm of the machine. Fig. 5 is an enlarged horizontal section in plan of the electrode clamping holder at the outer end of the lower arm shown in Fig. 4. Fig. 6 is a sectional view taken on a vertical line through the front end of the arm and electrode holder shown in Fig. 5. Fig. 7 is a cross section on line 7—7, Figs. 5 and 6, showing both electrodes, the bored lower arm, and a corner piece in welding position between the electrodes. Fig. 8 is a sectional view in plan on line 8—8, Fig. 3, showing the movable holder for the upper electrode, its cable connections with the transformer, and the water circulating pipes connected with said holder.

In detail, our improved machine comprises a hollow pedestal or base —2— having an integral foot portion 3 projected forwardly in line with and beneath overhanging arms 4 and 5, respectively, at the top of the pedestal. Arm 4 is the upper of the two arms and is cast integral with a hollow base-portion 6 approximately rectangular in cross-section but open at its bottom and front. Ears 7 at each side of base-portion 6 and bolts therein fasten arm 4 rigidly upon a cover or top plate 8 resting over the otherwise open top of pedestal 2. A forwardly-extending arm 9 is cast integral with plate 8 and has a bottom rib 10 which is accommodated by a slot 11 in the front wall 12 of pedestal 2, and this arm 9 serves as a brace support for arm 5 comprising a solid bar of copper connected with transformer 14. Suitable insulation 13 is interposed between arm 5 and plate 8 and its arm 9.

Plate 8 is partly depressed within pedestal 2 to seat transformer 14 and hollow portion 6 of arm 4 serves as a cover or casing for the transformer. Removal of the bolts from ears 7 permits removal of arm 4, thus giving convenient access to the transformer. The location of the transformer is directly to the rear of the upper and lower clamps or holders 15 and 16, respectively, mounted at the extreme front of arms 4 and 5, and this arrangement of parts is of advantage in giving direct electrical connections with the transformer on horizontal lines. However, the series of copper cable connections 17 for upper holder 15 are slightly curved to freely flex or bend and accommodate the vertical movement of holder 15 in welding operations. Movement of the holder 15 is obtained by a hand lever 18 having counterweight 18' and fulcrumed to tilt on a link 19 by a bolt 20 adapted to be inserted through openings 21 at different elevations on said link 19. Obviously, a change of position of the fulcrum of lever 18 will either raise or lower its handle-end, assuming that holder 15 is in a fixed rest position, and in Fig. 3 the dotted line x—x indicates such a changed setting of the handle. The character of the work or the length of reach of the operator determines the advisability of a change of setting of the handle. Holder 15 has a tubular stem 22 slidably mounted within a rotatable sleeve 23 secured in arm 4, and a swiveled yoke connection 24 is provided between hand lever 18 and the upper end of stem 22 as shown in the patent hereinbefore referred to. Link 19 is pivotally mounted on one or more ears 24 of sleeve 23 to give freedom of operation and prevent bind.

The electric current for the machine is controlled by a switch 25 mounted on hand lever 18, and also by a multiple-contact switch 26 mounted on the side of pedestal 2,—switch 26 being electrically connected with current regulator 27 within pedestal 2, see Fig. 1.

As shown, the upper electrode or copper contact-pin 28 is fastened in holder 15 by a bolted clamp 29, and the lower electrode or copper contact-pin 30 is fastened in vertical position at the outer end of arm 5 by holder 16 which comprises a yoke 31 of band steel or iron. The two electrodes or pins are axially alined and the work is placed between their beveled meeting ends. Vertical adjustment of both pins may be resorted to as wear occurs, and lower pin 30 has an adjustable backing screw 33 threaded in the bottom end of the reduced and tapered extension 34 of copper bar 5.

The narrowed construction of holder 16 is a valuable feature of our invention as advantageous results are achieved therewith heretofore either difficult or impossible to obtain in this type of machine. Then it will be noted that arm or bar 5 is substantially square in construction in its main body but is widened to provide a head 35 at its front end. Extension 34 is reduced in width as compared with head 35 and is tapered slightly, and as shown is an integral part of arm or bar 5 although it may be made separate and bolted thereon. The end of extension 34 is concaved to seat the round electrode or contact-pin 30, and the area of contact is purposely made substantially the full length of the electrode to gain good conductivity of current and avoid over-heating of the parts. Extension 34 is also made deeper, or in other words projected lower than head 35 and main bar 5 to give it the requisite strength to sustain the weight of the work and the down pressures thereon, and also to supply the required cross-sectional area for good conductivity of the current. Strength is also supplied to narrow extension 34 by steel yoke 31 which conforms in taper and hugs the sides of extension 34 and is fastened to head 35 by bolts 36 passing through openings in the lateral flanges 37 of the yoke. The outer or rounded portion 38 of the yoke may directly engage the electrode or contact-pin 30 as shown in Fig. 5, and therethrough fasten the contact-pin in place, or a copper piece may be inset therein. A contact-pin holder constructed substantially as described enlarges the field of usefulness of a machine of this type, as lap welds may be made in corners, and along angularly-related flanges or surfaces where the room to apply pressure and current from opposite sides of overlapping portions is limited.

Now referring to another important feature of the invention, a constant water circulation through both electrode holders 15 and 16 is provided by the following means, to wit,—An intake pipe 40 having a valve 41 to control the flow of water is supported within the top of pedestal 2 and has a vertical leg 42 extending into hollow-portion 6 of arm 4 at one side of copper bar 5. A horizontal pipe 43 extends from leg 42 to the outside of base-portion 6,—being supported by a lateral lug 44, see Fig. 8, and a rubber hose 45 is attached to the end of pipe 43 and extends forwardly in the same plane as flexible conductors 17 to one exposed end 44 of a pipe 45 carried by holder 15. This pipe 45 is bent into U shape and is embedded in holder 15 with its middle bend 46 surrounding the opening for upper electrode or contact-pin 28, and the pipe extremities 44 and 47 project at opposite sides of the holder to permit attachment of separate sections of rubber hose—feed section 45 as described, and a return section 48 which connects with elbow pipe 49 supported by insulating plug 50 on arm portion 6, see Fig. 8. The lower end of elbow pipe 49 is connected with a copper tube 51 which extends along the side of copper bar 5 until head 35 is reached and thence downwardly and along the bottom of tapered extension 34 to a point adjacent electrode 30 where a vertical bore 52 is made in the extension on a parallel line with the electrode, and the end of tube 51 extends into bore 52 nearly to its top. A discharge tube 53 extends from the lower plugged end of bore 52 back along bar 5 to the vertical stem 54 of a discharge pipe 55 supported upon top plate 8 and pedestal 2 by insulating plugs 56—the plugs being necessary to insulate the metal pipe from the cast-iron supports described. Pipe 55 terminates in a downwardly-extending nipple 57 outside of pedestal 2, partly to prevent loss of current and partly that the flow of water may be under constant observation and also that it may be tested by touch as to its warmth so that intelligent regulation may be had at valve 41 to meet cooling requirements at the electrodes. A funnel 58 and drain pipe 59 mounted on pedestal 2 beneath and apart from nipple 57 carry off the water to any distant point. Water cooling of the electrodes and their holders as described save current, prolong the life of the electrodes, and prevent spreading of the heat to the parts handled or touched by the operator. The two sections of rubber hose for circulating water through holder 15 are introduced in the line of water connections to permit free vertical movement of the holder, and obviously, this is only one way of providing for a flow of water and giving accommodation for the movement required. However, the use of rubber hose also serves to insulate the upper holder 15 from bar 5, no appreciable loss of current being otherwise noticeable in practice by the passage of water in the continuous manner shown and provided.

Top plate 8 is provided with a vertical flange or rib 8ª at either side of arm portion 6 and the space 8ᵇ between is utilized as a shelf to hold tools or extra contact-pins; the latter being round, the rib 8ª guards them from rolling off.

What we claim is:

1. In a welding machine of the class described, a cylindrical-welding electrode and an electric-current conducting support therefor comprising an extended body narrowed in width to substantially the diameter of said electrode, and means to fasten said electrode upon said body.

2. In a welding machine of the class described, a welding contact-pin and a support therefor comprising a narrow arm and a clamping yoke of band metal removably secured to said arm.

3. In a machine of the class described, a welding contact pin, and a supporting member therefor comprising a tapering extension having a concaved end to seat said pin, and a relatively thin clamping yoke for said contact-pin fastened to said extension.

4. In a machine of the class described, a welding contact pin, and a supporting member for said contact-pin comprising a flat tapering body of the same width relatively as the diameter of said contact-pin and having an end face to engage the side of the contact-pin, a reinforcing clamping yoke for said contact-pin, and means to fasten said yoke upon said body.

5. In a machine of the class described, a welding contact-pin, and a relatively narrow and deep copper arm having a concaved recess at its end to seat said contact-pin, and a clamping yoke for said contact-pin made of band metal and having leg portions engaged with the side faces of said narrow arm, and bolts to tighten and fasten said yoke in place.

6. In a machine of the class described, a welding contact-pin, an arm having an enlargement and a tapering extension, and a yoke member of flat stock bent to encircle said contact-pin and overlap either side of said extension and having laterally-projecting ends, and bolts through said ends entered into said enlargement to fasten said yoke and contact pin in place.

7. In a machine of the class described, a welding contact-pin, and an arm having a head provided with a narrowed extension projected lower than said arm, and a yoke of band metal to clamp said contact-pin upon said extension.

8. In a machine of the class described, a welding contact-pin, an elongated arm of narrow width to support said contact-pin, a yoke member to clamp said contact-pin upon said arm, and a backing-screw supported by said arm to engage the end of said contact-pin.

9. In a machine of the class described, a welding contact-pin and a holder therefor comprising a copper bar of narrow width, a strap yoke extended along the sides of said bar, and means to draw said yoke longitudinally of said bar to clamp said contact-pin in place thereon.

10. In an electric welding machine, a pair of projecting arms and electrode holders at their front ends, the upper arm having a hollow head at its base adapted to confine a transformer therein centrally in line with said holders and provided with openings in its wall to make transformer connections and for the circulation of air, in combination with a transformer seated within said head and electrical connections therewith extending to said holders.

11. In an electric welding machine, a pair of superimposed forwardly-projecting arms and welding members mounted in the front ends thereof, the upper of said arms having an integral hollow base portion open at its bottom and front, a support for said arms beneath the base thereof, a transformer seated upon said support within the base of said arm apart from the walls thereof and above the horizontal plane of the lower arm, and electrical connections leading from said transformer to said welding members.

12. In an electric welding machine, a pedestal having a top plate and a forwardly projecting lower arm and an upper arm removably mounted upon said top-plate above the said lower arm having a hollow head, in combination with welding members mounted upon said arms respectively and a transformer seated within said head apart from the walls thereof and having flexible electrical connections with one of said welding members.

13. In an electric welding machine, a pedestal and a pair of superimposed separately-removable arms mounted upon said base and welding members on the extremities of said arms, the upper of said arms having a hollow compartment in its base, in combination with a transformer seated within said compartment apart from the walls thereof and said compartment having an air circulating space around the sides and top thereof and electrical connections leading to said welding members from said transformer.

14. In an electric welding machine, a pedestal having a pair of superimposed forwardly-extending arms at its top and a forwardly-extending foot at its bottom, welding members mounted at the front ends of said arms and a transformer electrically insulated from said pedestal and arms and mounted above the horizontal plane of the lower arm between the rear portions of said arms and apart from the wall of the upper arm, and separate electrical connections between said transformer and welding members.

15. In an electric welding machine, a hollow pedestal, a pair of forwardly-extending arms having compartmented rear portions oppositely seated above said pedestal, welding members at the front of said arms, a transformer having electrical connections with said members and mounted within the compartment formed by said arms and an electric-current controlling device confined within the said hollow pedestal and electrically connected with said transformer.

16. In an electric welding machine, a hollow pedestal, a rigid arm in a separate piece having a compartment at its base mounted on the top of said pedestal and provided with air openings front and rear, a forwardly-extending arm beneath said rigid arm, welding members on the front ends of said arms, a transformer confined within and apart from the walls of said compartment, an electric-current regulator within said pedestal, and electrical connections between said welding members, transformer and current regulator.

17. In an electric welding machine, a hollow pedestal, a top plate having a forwardly-extending arm removably mounted upon said pedestal, a transformer seated upon said top plate and electrically insulated therefrom, an over-hanging arm having a hollow-base portion covering said transformer with an air-circulating space about the same, welding members supported at the front end of said arms, and electrical connections between said members and said transformer.

18. In an electric welding machine, a vertically movable electrode holder, a lever pivotally connected to said holder and adjustable means providing a fulcrum for said lever at different elevations in a substantially perpendicular line without change of distance between the lever and holder pivot and said fulcrum.

19. In an electric welding machine, a vertically slidable electrode holder and a lever having a pivot connection therewith, a perpendicular oscillatory link to support said lever for tilting movement, and means to fulcrum said lever in a substantially perpendicular line at different elevations on said link without change in leverages.

20. In an electric welding machine, a hollow pedestal having a pair of forwardly-extending arms at its top, one of which is provided with a compartment, welding members mounted at the front end of said arms, a lever to operate one of said members, an electric switch carried by said lever, a transformer seated upon one of said arms and confined within the compartment of the other arm, a current-regulator mounted within said hollow pedestal beneath said transformer, a multiple-contact switch supported by said pedestal at the side thereof, and electrical connections placing said lever switch, current-regulator, multiple-contact switch, transformer and welding members in an electric circuit.

21. In an electric welding machine, a welding contact-pin, a holder having a clamping seat for said pin and a bore parallel and in close relation therewith, and water-circulating inlet and outlet pipes extending into one and the same end of said bore.

22. In an electrical welding machine, a welding pin holder having a grooved seat at its end and a water-circulating passage parallel and adjacent thereto, and water intake and outlet pipes extending from said passage.

23. In an electrical welding machine, a pedestal, a set of welding contact-pins having holders provided with water-circulating connections, a valve to control the flow of water, and a funnel and a discharge pipe mounted on said pedestal beneath said funnel.

In testimony whereof we affix our signatures in presence of two witnesses.

WILLIAM C. WINFIELD.
ALBERTIS C. TAYLOR.

Witnesses:
M. J. SLOAN,
GEO. T. FILLIUS.